US012767067B2

(12) United States Patent
Horikiri

(10) Patent No.: US 12,767,067 B2
(45) Date of Patent: Oct. 20, 2026

(54) LINING MATERIAL FOR MOLDED CEILING FOR VEHICLE AND MOLDED CEILING FOR VEHICLE

(71) Applicant: Howa Co., Ltd., Kasugai (JP)

(72) Inventor: Shingo Horikiri, Kasugai (JP)

(73) Assignee: Howa Co., Ltd., Kasugai (JP)

( * ) Notice: Subject to any disclaimer, the term of this patent is extended or adjusted under 35 U.S.C. 154(b) by 0 days.

(21) Appl. No.: 19/056,103

(22) Filed: Feb. 18, 2025

(65) Prior Publication Data

US 2025/0303978 A1 Oct. 2, 2025

(30) Foreign Application Priority Data

Mar. 27, 2024 (JP) ................................ 2024-051124

(51) Int. Cl.

| | |
|---|---|
| ***B32B 7/12*** | (2006.01) |
| ***B32B 5/02*** | (2006.01) |
| ***B32B 5/18*** | (2006.01) |
| ***B32B 5/24*** | (2006.01) |
| ***B32B 5/26*** | (2006.01) |
| ***B32B 27/12*** | (2006.01) |
| ***B32B 27/32*** | (2006.01) |
| ***B60R 13/02*** | (2006.01) |
| ***D04H 1/492*** | (2012.01) |
| ***D06M 10/06*** | (2006.01) |

(52) U.S. Cl.

CPC .......... *B60R 13/0212* (2013.01); *B32B 5/022* (2013.01); *B32B 5/18* (2013.01); *B32B 5/245* (2013.01); *B32B 5/26* (2013.01); *B32B 7/12* (2013.01); *B32B 27/12* (2013.01); *B32B 27/32* (2013.01); *D04H 1/492* (2013.01); *D06M 10/06* (2013.01); *B32B 2255/02* (2013.01); *B32B 2255/205* (2013.01); *B32B 2266/0278* (2013.01); *B32B 2307/304* (2013.01); *B32B 2307/54* (2013.01); *B32B 2307/5825* (2013.01); *B32B 2307/7242* (2013.01); *B32B 2605/003* (2013.01); *B60R 2013/0287* (2013.01); *D10B 2505/12* (2013.01)

(58) Field of Classification Search

CPC ....... B32B 7/12; B32B 7/027; B60R 13/0212; B60R 13/0218; B60R 13/0815

See application file for complete search history.

(56) References Cited

FOREIGN PATENT DOCUMENTS

| | | |
|---|---|---|
| JP | 2013-129308 A | 7/2013 |
| JP | 2019-117228 A | 7/2019 |

OTHER PUBLICATIONS

JP 2013-129308 (Year: 2013).*
KR 2017-0103568 (Year: 2017).*

* cited by examiner

*Primary Examiner* — Elizabeth E Mulvaney
(74) *Attorney, Agent, or Firm* — Christensen, Fonder, Dardi & Busse PLLC; John P. Fonder

(57) ABSTRACT

A lining material for a molded ceiling for a vehicle is interposed between a base material of the molded ceiling and a vehicle body panel. The lining material has a fiber layer and a heat-shielding film layer. The fiber layer is a nonwoven fabric in the form of a sheet facing the vehicle body panel side. The heat-shielding film layer is a metal film integrated on one side of the fiber layer and reflects radiant heat from the vehicle body panel side. A barrier layer is laminated on the base material side of the fiber layer via adhesive resin. The barrier layer interrupts or inhibits airflow from the base material side.

19 Claims, 3 Drawing Sheets

LINING MATERIAL FOR MOLDED CEILING FOR VEHICLE AND MOLDED CEILING FOR VEHICLE

CROSS-REFERENCE TO RELATED APPLICATIONS

This application claims priority to Japanese patent application serial number 2024-51124 filed Mar. 27, 2024, the contents of which are incorporated herein by reference in their entirety for all purposes.

BACKGROUND

The present invention relates to lining materials for molded ceilings for vehicles and molded ceilings for vehicles.

Various materials have been conventionally known as molded ceiling materials for vehicles. For example, since an interior of an automobile becomes very hot during extremely hot periods, molded ceiling materials with functions such as heat shielding and heat insulation have been developed in recent years. The ceiling panel of a vehicle body has a large surface area, and radiant heat from sunlight irradiating the ceiling panel has a significant impact on a rise in a vehicle cabin temperature. Energy load due to use of air conditioners also increases as the vehicle cabin temperature rises. Therefore, as one means of controlling the temperature rise in the vehicle cabin, molded ceiling materials with a heat shielding function are installed.

Conventional molded ceiling material discloses a far infrared reflective film, which reflects radiant heat from the ceiling panel and therefore suppresses heat in a vehicle cabin. An aluminum vapor deposited film with an aluminum vapor deposited layer formed on a surface of a base film is also used as an example of the infrared reflective layer.

Aluminum vapor deposited films conventionally used as lining materials for vehicle ceiling materials are often composed of a base film and a heat shielding layer. The base film may be, for example, a resin film made of polyethylene terephthalate, polypropylene, or the like. A heat shielding layer is formed by vapor-depositing aluminum on the surface of the base film. However, these base films have a characteristic of stretching well when drawn, and there is a risk that the base film may stretch more than expected when the vehicle ceiling material is molded. There was a tendency for a difference to occur between an elongation of the drawn heat shielding layer and an elongation of the base film. The molded article of vehicle ceiling material includes areas with significant changes in undulation and shape, such as inflection points. In these areas, the difference in elongation causes excessive pressure to be applied, leading to generating sink mark, scaling and cracking in the heat shielding layer. As a result, there was concern that the heat shielding performance of the vehicle ceiling material may deteriorate in some areas.

There has been a need for a lining material for a molded ceiling for vehicles and a molded ceiling for vehicles that improves heat shielding performance and prevents scaling and cracking of a heat-shielding layer.

SUMMARY

According to one aspect of the present disclosure, a lining material for a molded ceiling for vehicles may be interposed between a base material of a molded ceiling for vehicles and a vehicle body panel. The lining material has a fiber layer, a heat-shielding film layer, and a barrier layer. The fiber layer is a nonwoven fabric that is a sheet facing the vehicle body panel side. The heat-shielding film layer consists of a metal film integrally formed with one side of the fiber layer to reflect radiant heat from the vehicle body panel side. The barrier layer is laminated on the base material side of the fiber layer via adhesive resin and serves to interrupt or inhibit airflow from the base material side.

As described above, the lining material includes a fiber layer facing the vehicle body panel and a barrier layer laminated on a vehicle cabin side of the fiber layer via adhesive resin. The fiber layer is a nonwoven fabric in the form of a sheet, and a heat-shielding film layer is formed on one side of the fiber layer so as to be integral with the fiber layer. The nonwoven fabric constituting the fiber layer has high tensile strength and lower elasticity than a resin film. Therefore, the fiber layer may suppress elongation of the lining material during molding of the molded ceiling for vehicles. The lining material includes areas with significant changes in undulation and shape. Even in such areas, the heat-shielding film layer and the fiber layer deform together, making it difficult for a difference in elongation to occur between the fiber layer and the heat-shielding film layer. In other words, the heat-shielding film layer is restricted from being drawn excessively, preventing scaling and cracking of the heat-shielding film layer. Therefore, this configuration ensures that the molded ceiling for vehicles has a stable heat-shielding effect.

The fiber layer may be selected from spunbonded nonwoven fabric or spunlace nonwoven fabric. These nonwoven fabrics have surfaces that are excellent in smoothness, making them easy to process for heat shielding treatments such as vapor deposition or printing. Therefore, they are suitable as a fiber layer to integrate the heat-shielding film layer.

The heat-shielding film layer may be an aluminum vapor-deposited film. Since aluminum has a high infrared reflectivity, the heat shielding effect may be improved by using an aluminum vapor-deposited film as the heat-shielding film layer. In addition, by forming the heat-shielding film layer by vapor deposition, it is easy to control the film thickness to form a thinner film layer. Therefore, the heat-shielding film layer may be formed according to specifications of the molded ceiling for vehicles.

The heat-shielding film layer may be formed on the vehicle body panel side of the fiber layer. A protective layer may be laminated on the vehicle body panel side of the heat-shielding film layer.

With the above configuration, the heat-shielding film layer faces the vehicle body panel side. This may improve the reflection efficiency of radiant heat from the vehicle body panel. In other words, the heat shielding effect may be improved. Furthermore, the protective layer may prevent dislodgement of aluminum particles constituting the heat shielding film layer.

A molded ceiling for vehicles is a molded ceiling including the above-described lining material. The molded ceiling for vehicles has areas with significant changes in undulation and shape. Even in such areas, difference in elongation between the fiber layer and the heat-shielding film layer hardly occurs when the molded ceiling for vehicles is press-molded, therefore, preventing scaling and cracking of the heat-shielding film layer. Thus, it is possible to provide a molded ceiling for vehicles with a stable heat shielding effect.

DETAILED DESCRIPTION

Figure 1:
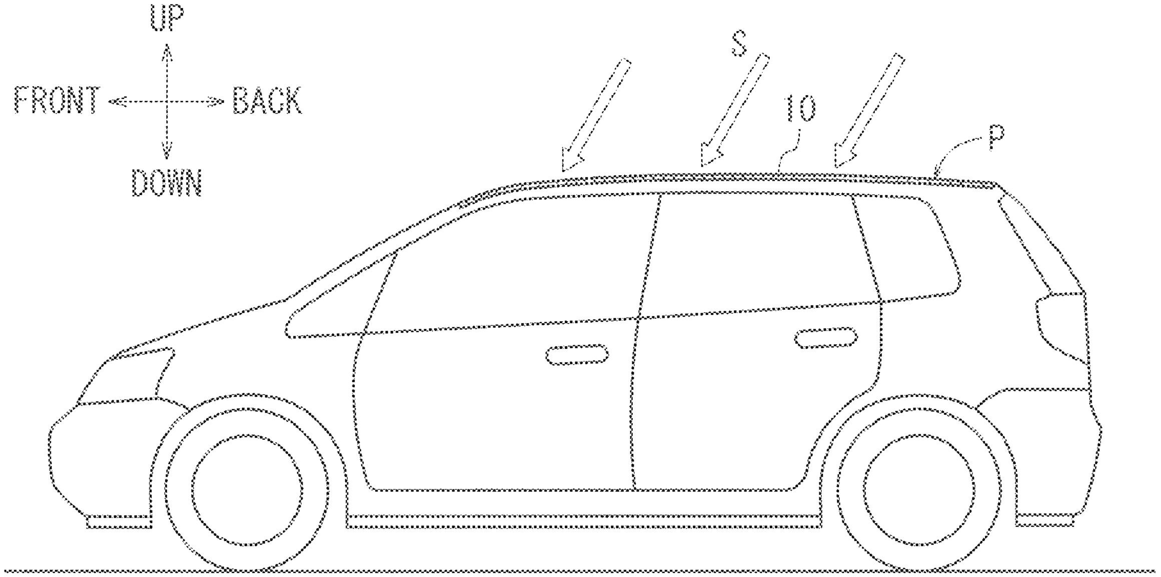
FIG. 1 is a schematic view of a molded ceiling mounted on a vehicle.
Figure 2:
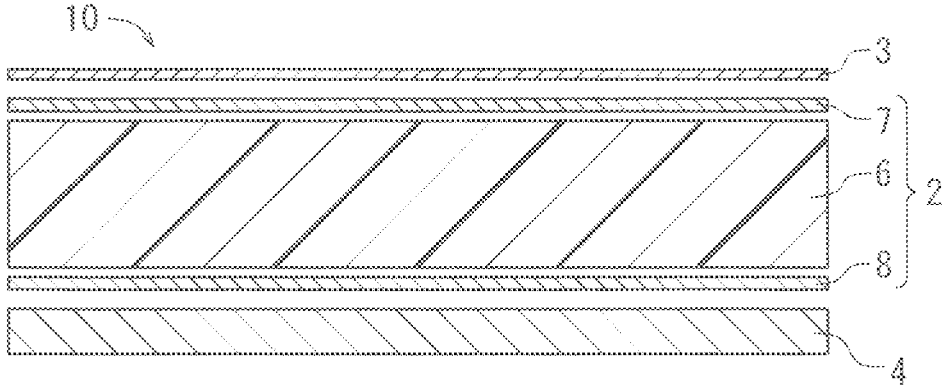
FIG. 2 is a cross-sectional schematic view of the molded ceiling for the vehicle according to one embodiment.
Figure 3:
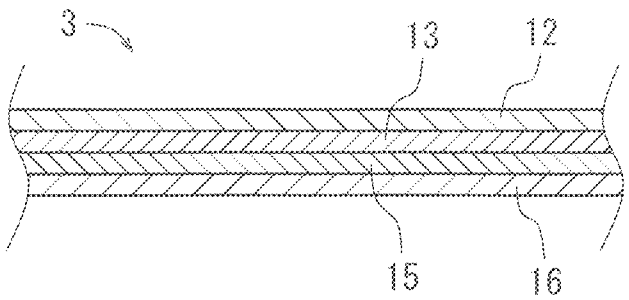
FIG. 3 is a cross-sectional schematic view of a lining material according to the embodiment.
Figure 4:
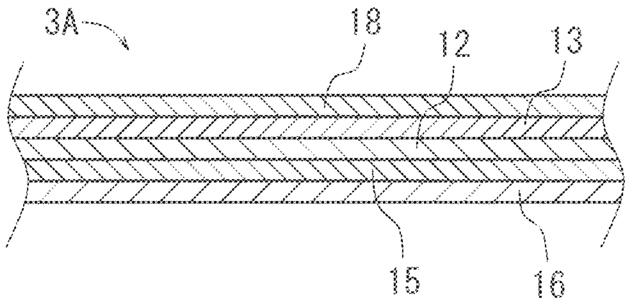
FIG. 4 is a cross-sectional schematic view of a lining material according to another embodiment.

Hereinafter, embodiments according to the present invention will be described with reference to drawings. A vehicle includes a ceiling panel P (vehicle body panel) made of steel plate as a roof. As shown in FIG. 1, a molded ceiling 10 for vehicles according to the present embodiment is a ceiling interior material attached to a vehicle cabin side of this ceiling panel P. As shown in FIG. 2, the molded ceiling 10 for vehicles has a laminate including a base material layer 2 (base material), a lining material 3, and a skin material 4. The laminate may be heated and press-molded, for example, by heat pressing. Cross-sectional schematic views in FIGS. 2 to 4 show an upper side of a sheet as a ceiling panel P side and a lower side as a vehicle cabin side.

The lining material 3 is disposed on the ceiling panel P side of the base material layer 2. As shown in FIG. 3, the lining material 3 includes a fiber layer 12 and a barrier layer 16 laminated on a surface of the base material layer 2 side (vehicle cabin side) of the fiber layer 12. The fiber layer 12 and the barrier layer 16 are surface-bonded to each other via an adhesive resin layer 15 (adhesive resin) provided in between. Furthermore, the lining material 3 has a heat-shielding film layer 13, which is integrally formed with the fiber layer 12 on one side of the fiber layer 12.

The fiber layer 12 may be, for example, selected from a spunbonded nonwoven fabric or a spunlace nonwoven fabric. The spunbonded nonwoven fabric contains a bonded multilayer fiber web. A sheet-like fiber web may be formed by directly accumulating long continuous fibers obtained by melting and spinning raw resin. Multiple fiber webs are stacked and bonded together using a thermal bonding method for thermocompression bonding. Spunbonded nonwoven fabrics have high strength against tension owing to the use of long fibers. Spunlace nonwoven fabrics have a sheet-like fiber web, and the fibers within the web are entangled. The sheet-like fiber web may be formed from short fibers, for example, by a dry process. A high-pressure water jet is injected onto the fiber web in a columnar manner to entangle the fibers within the web. The spunlace nonwoven fabrics are formed by the strong entanglement of the fibers to ensure a high level of strength. Surfaces of spunbonded and spunlace nonwoven fabrics are smooth, making them easy to process for heat shielding treatments such as vapor deposition or printing as will be described below.

For example, PET (polyester) fiber and PP (polypropylene) fiber may be selected as the main raw materials for the nonwoven fabrics that form the fiber layer 12. Various synthetic fiber nonwoven fabrics such as polyamide-based, polyester-based, polyacrylonitrile-based may be applied to the fiber layer 12.

The heat-shielding film layer 13 consists of a metal film integrated on one side of the fiber layer 12 and has the infrared reflective function. In other words, the heat-shielding film layer 13 has the reflective function of the radiant heat from the ceiling panel P. As shown in FIG. 3, for example, the heat-shielding film layer 13 is integrally formed with the fiber layer 12 on the surface of the base material layer 2 side of the fiber layer 12. The heat-shielding film layer 13 may be composed of, for example, an aluminum vapor-deposited film. The aluminum vapor-deposited film is formed by heating and evaporating aluminum by an electron beam or high-frequency induction in a high vacuum condition to deposit fine aluminum particles on one side of the fiber layer 12.

The heat-shielding film layer 13 may be configured to be formed by printing instead of vapor deposition. For example, besides vapor deposition, the aluminum film may be formed by gravure printing, where ink mixed with aluminum particles is adhered to cells of a cylindrical engraved plate and then transferred to one side of the fiber layer 12 to create aluminum film as the heat-shielding film layer 13.

The barrier layer 16 is an air impermeable film and, for example, a cast polypropylene film may be selected. As a polypropylene used as the base material for cast polypropylene (CPP) has not been subjected to a stretching process and then CPP has a property of stretching when it is drawn. The barrier layer 16 has tensile strength, tear resistant, and a character for interrupting or restricting airflow. Specifically, the barrier layer 16 restricts air between the barrier layer 16 and the base material layer 2 from flowing beyond the barrier layer 16 to other parts of the lining material 3. The adhesive resin layer 15 bonds the barrier layer 16 and the fiber layer 12 and, for example, extruded polypropylene may be selected, in which the adhesive resin is melted and forced through a die to form the adhesive resin layer 15.

The molded ceiling 10 may have a lining material 3A in FIG. 4 alternatively to the lining material 3 in FIG. 3. As shown in FIG. 4, the heat-shielding film layer 13 of the lining material 3A is formed on the ceiling panel P side of the fiber layer 12. In this configuration, a protective layer 18 is laminated on the ceiling panel P side of the heat-shielding film layer 13. The protective layer 18 is provided to prevent the dislodgement of aluminum particles that constitute the heat-shielding film layer 13, and is formed of, for example, acrylic resin or urethane laminated to the layer.

As shown in FIG. 2, the base material layer 2 includes a porous core material 6 and fiber-reinforced layers 7 and 8 laminated on both sides of the core material 6. The core material 6 and the fiber-reinforced layers 7 and 8 are bonded using thermosetting adhesive or the like. The core material 6 maintains the shape and ensures the rigidity of the molded ceiling 10 for vehicles, and it has a surface shape along a surface of the ceiling panel P. A semi-rigid layer of urethane foam made of urethane resin foam may be selected for the core layer 6.

A first fiber-reinforced layer 7 is laminated on a ceiling panel P side surface of the core material 6 while a second fiber-reinforced layer 8 is laminated on a vehicle cabin side surface, respectively. The first and second fiber-reinforced layers 7 and 8 maintain the shape and ensure the rigidity of the molded ceiling 10. These fiber-reinforced layers 7 and 8 are coated or impregnated with thermosetting adhesive (thermoplastic resin) on the surfaces and are bonded to both sides of the core material 6, respectively. Fiberglass mats are selected for the first and second fiber-reinforced layers 7 and 8. The fiberglass mats are formed in a sheet by solidifying chopped strands of fiberglass that are inorganic fibers cut to appropriate lengths, with an appropriate binder. A nonwoven fabric protecting the surface of the second fiber-reinforced layer 8 may be laminated on the vehicle cabin side of the second fiber-reinforced layer 8. For example, a needle-punched nonwoven fabric may be selected for this nonwoven fabric.

The fiber-reinforced layers 7 and 8 may be made of fiberglass solidified with a binder without cutting (continuous strand mat). Alternatively, spunlace and/or spunbonded nonwoven fabrics, glass papers, or fiberglass woven fabrics may be used. A base weight in the embodiment may be selected to meet required strength and various other conditions.

The fiber-reinforced material for the fiber-reinforced layers 7 and 8 may be suitably selected from inorganic fibers such as chopped strands or natural organic fibers such as jute, kenaf, ramie, hemp, sisal, bamboo or other natural fibers and may be formed into sheets or mats using acrylic or other binders or by needling.

Thermosetting resin consisting of isocyanate resin may be selected for thermosetting adhesive. Isocyanate is suitable from a perspective of easily conforming to the core material 6, which is a semi-rigid layer of urethane foam. The thermosetting adhesive is not limited to isocyanate resin and may be selected as appropriate. The thermosetting adhesive is applied by a spray or roll coater or other means. As described above, the strength of the molded ceiling 10 for vehicles may be improved by laminating the fiber-reinforced layers 7 and 8 containing thermosetting resin and the core material 6.

The skin material 4 is arranged on the vehicle cabin side of the base material layer 2 as a part that serves as a design surface of the molded ceiling 10 for vehicles. The skin material 4 may be selected from, for example, a laminate of a surface layer and a urethane foam sheet. The surface layer may be applied to a variety of materials, such as textiles, including fabric, cloth, knit, or other fabric, including woven, nonwoven, raised fabric, rare woolen fabric or luxury woolen fabric, or synthetic leather, artificial leather, genuine leather. The urethane foam sheet is laminated by applying a soft layer made of urethane resin foam to obtain a soft touch on the molded ceiling 10 for vehicles. The skin material 4 may be formed without the urethane foam sheet.

[Comparison of Lining Material Strength]

After tensile force was applied to the lining material of the embodiment and a lining material of a comparative example, elongations, as well as occurrence of scaling and cracking, were compared.

[Example] The lining material 3 has a fiber layer 12, an adhesive resin layer 15, and a barrier layer 16. The fiber layer 12 is a spunbonded nonwoven fabric that has been treated with aluminum vapor deposition as the heat-shielding film layer 13. The barrier layer 16 is adhered to the fiber layer 12 via resin adhesive (adhesive resin layer 15). The barrier layer 16 is a cast polypropylene film.

Figure 5:
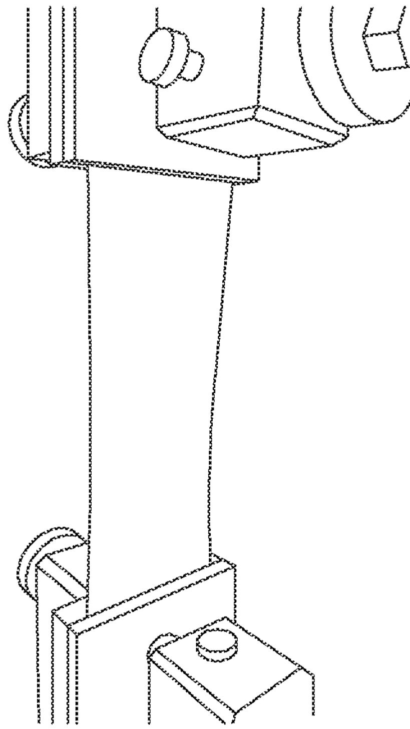
FIG. 5 shows a state where the lining material is subjected to a tensile force according to an example.
Figure 6:
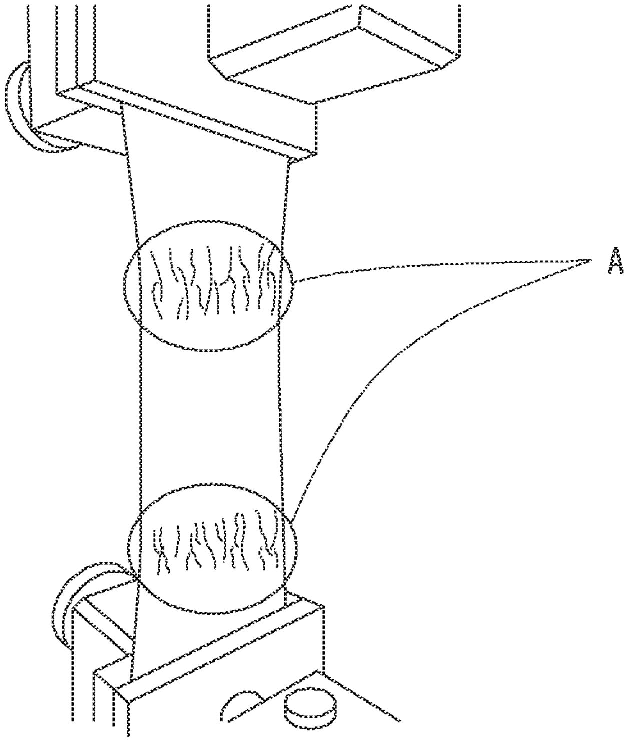
FIG. 6 shows a state where the lining material is subjected to a tensile force according to a comparative example.

[Comparative Example] This is a lining material made of a conventional aluminum vapor-deposited film. As shown in FIG. 5, no scaling or cracking was observed in the heat-shielding film layer 13 of the lining material according to the embodiment. The elongation of the lining material of the embodiment could be limited to about one third in the longitudinal and lateral directions compared to the elongation of the lining material of the conventional product. As shown in FIG. 6, the lining material of the conventional product exhibited scaling and cracking in the aluminum vapor-deposited film, for example, within the areas indicated by A.

[Effects of Embodiments]

The lining material 3 of the molded ceiling 10 for vehicles according to the above embodiment has a fiber layer 12 facing the ceiling panel P (vehicle body panel) and a barrier layer 16 located on the base material layer 2 side (vehicle cabin side). The barrier layer 16 is laminated to the fiber layer 12 via the adhesive resin layer 15 (adhesive resin). The fiber layer 12 is a nonwoven fabric in the form of a sheet, and a heat-shielding film layer 13 is formed on one side of the fiber layer 12 so as to be integral with the fiber layer 12. The nonwoven fabric constituting the fiber layer 12 has a high tensile strength and is less elastic than the resin film, thereby suppressing the elongation of the lining material 3 during the molding of the molded ceiling 10 for vehicles. The heat-shielding film layer 13 deforms together with the fiber layer 12, making it difficult for a difference in elongation to occur between the fiber layer 12 and the heat-shielding film layer 13, even in areas with significant changes in undulation or shape. In other words, the heat-shielding film layer 13 is restricted from being excessively drawn such that scaling and cracking of the heat-shielding film layer 13 may be prevented. Therefore, this configuration ensures to provide a stable heat-shielding effect of the molded ceiling 10 for vehicles.

The lining material 3 according to the embodiment may be selected from spunbonded nonwoven fabric or spunlace nonwoven fabric as the heat-shielding film layer 13. The spunbonded nonwoven fabric or spunlace nonwoven fabric have excellent surface smoothness, making them easy to process for heat shielding treatments such as vapor deposition or printing. Therefore, they are suitable as a fiber layer 12 to integrate the heat-shielding film layer 13.

The lining material 3 according to the above embodiment has been treated with an aluminum vapor deposition as the heat-shielding film layer 13. Since aluminum has a high infrared reflectivity, the heat shielding effect may be improved by using an aluminum vapor-deposited film as the heat-shielding film layer 13. In addition, by forming the heat-shielding film layer 13 by vapor deposition, it is easy to control the film thickness, such as forming a thinner film layer. Therefore, it is possible to form the heat-shielding film layer 13 according to specifications of the molded ceiling 10 for vehicles.

The lining material 3A shown in FIG. 4 has a heat-shielding film layer 13 on the ceiling panel P side of the fiber layer 12. This configuration may improve the reflection efficiency of radiant heat from the ceiling panel P. In other words, the heat shielding effect may be improved. Furthermore, a protective layer 18 is provided on the ceiling panel P side of the heat-shielding film layer 13. This configuration may prevent the dislodgement of aluminum particles ensuring the durability and effectiveness of the heat-shielding film layer 13.

The lining material 3 shown in FIG. 3 or the lining material 3A shown in FIG. 4 may be used for the molded ceiling 10 for vehicles. The molded ceiling 10 has areas with significant changes in undulation and shape. Even in such areas, the difference in elongation between the fiber layer 12 and the heat-shielding film layer 13 is hardly to occur when the molded ceiling 10 is press-molded. As a result, scaling and cracking of the heat-shielding film layer 13 may be prevented. Therefore, it is possible to provide a molded ceiling 10 with a stable heat shielding effect.

The lining material 3 and 3A has a barrier layer 16 made of air impermeable film on the base material layer 2 side to interrupt or inhibit airflow between the base material layer 2 and the lining material 3. In other words, the lining material 3 has the function of air-impermeability provided to a lining material of a conventional product, and also has the function of suppress the elongation of the lining material 3 during the molding of the molded ceiling 10.

The heat-shielding film layer 13 of the lining material 3 and 3A has the infrared reflective function. With this configuration, the radiant heat of sunlight S received by the ceiling panel P is reflected, thereby suppressing heat input into the vehicle cabin. Therefore, the temperature rise in the vehicle cabin due to radiant heat from sunlight S may be suppressed. Furthermore, energy consumption associated with use of an air conditioner may be reduced.

The lining material for the molded ceiling for vehicles and the molded ceiling for vehicles according to the present disclosure shall not be limited to the appearance and configuration described in the above embodiments, and may be implemented in various other forms with various modifications, additions, deletions, and combinations of configurations without departing from the scope of the present invention.

Although examples of a configuration in which a core material of urethane foam and a fiber-reinforced layer are laminated have been described as the configuration of the base material layer for the above embodiments, various configurations may be applied without being limited to this configuration. For example, a molded body with nonwoven fabric laminated on both sides of a core material containing fiberglass and thermoplastic resin, or a molded nonwoven fabric, may also be selected as a configuration of the base material layer.

The heat-shielding film layer of the present disclosure shall not be limited to aluminum, but may also include other metal films, such as copper, for example, that reflect infrared rays to provide a heat shielding effect.

The invention claimed is:

1. A molded ceiling for a vehicle, comprising:

a base material layer having a core material and a plurality of fiber-reinforced layers;

a thermosetting adhesive for bonding the core material to the fiber-reinforced layers; and a lining material including:

- a fiber layer being a nonwoven fabric in a form of a sheet facing toward a vehicle body panel side;
- a heat-shielding film layer made of a metal film integrally formed with one side of the fiber layer for reflecting radiant heat from the vehicle body panel side; and
- a barrier layer laminated on a base material side of the fiber layer via adhesive resin for interrupting or preventing airflow from flowing between the barrier layer and the base material side through the barrier layer.

2. The molded ceiling according to claim 1, wherein the fiber layer is selected from a group consisting of spunbonded nonwoven fabric or spunlace nonwoven fabric.

3. The molded ceiling according to claim 1, wherein the heat-shielding film layer consists of an aluminum vapor-deposited film.

4. The molded ceiling according to claim 1, wherein the heat-shielding film layer is formed on the vehicle body panel side of the fiber layer, and wherein a protective layer is laminated on the vehicle body panel side of the heat-shielding film layer.

5. A molded ceiling for a vehicle, comprising:

a base material layer having a core material and a plurality of fiber-reinforced layers;

a thermosetting adhesive for bonding the core material to the fiber-reinforced layers; and a lining material including:

a fiber layer being a nonwoven fabric in a form of a sheet facing a vehicle body panel side;

a heat-shielding film layer consisting of a metal film integrally formed with one side of the fiber layer for reflecting radiant heat from the vehicle body panel side;

a barrier layer laminated on a base material side of the fiber layer via adhesive resin for interrupting or preventing airflow from flowing between the barrier layer and the base material side through the barrier layer; and an adhesive resin layer configured to bond the barrier layer to the fiber layer.

6. The molded ceiling according to claim 5, wherein the fiber layer is made from nonwoven fabric selected from a group consisting of spunbonded nonwoven fabric, spunlace nonwoven fabric, and any combination thereof.

7. The molded ceiling according to claim 6, wherein the spunbonded nonwoven fabric is created by directly accumulating long and continuous fibers obtained by melting and spinning raw resin.

8. The molded ceiling according to claim 6, wherein the spunlace nonwoven fabric is created by entangling short fibers using a high-pressure water jet to form a strong and smooth sheet-like fiber web.

9. The molded ceiling according to claim 5, wherein the barrier layer has a high tensile strength and tear resistance for maintaining durability and stability of the lining material.

10. The molded ceiling according to claim 5, wherein the metal film is an aluminum vapor-deposited film.

11. The molded ceiling according to claim 10, wherein the aluminum vapor-deposited film is formed by heating and evaporating aluminum using an electron beam or high-frequency induction in a high vacuum condition to deposit aluminum particles on one side of the fiber layer forming the heat-shielding layer.

12. The molded ceiling according to claim 5, wherein the heat-shielding film layer further comprises a protective layer for preventing dislodgement of metal particles of the heat-shielding film to ensure durability and effectiveness of the heat-shielding film layer.

13. The molded ceiling according to claim 5, wherein the heat-shielding film layer is formed by printing, preferably gravure printing, and wherein ink mixed with aluminum particles is adhered to cylindrical engraved plate cells and transferring to one side of the fiber layer.

14. A method of applying the adhesive resin layer of claim 5 to bond the fiber-barrier layer to the fiber layer, the method comprising:

extruding an adhesive resin, wherein the adhesive resin is melted and forced through a die to form the adhesive resin layer; and laminating the barrier layer onto the fiber layer using the adhesive resin layer to securely attach the barrier layer to the fiber layer.

15. The method of claim 14, wherein the extruding step is extruded polypropylene.

16. The method of claim 14, wherein the barrier layer is air impermeable and configured to prevent air from flowing to other parts of the lining material.

17. A molded ceiling for a vehicle comprising:

a base material layer having a core material and a plurality of fiber-reinforced layers;

a thermosetting adhesive for bonding the core material to the fiber-reinforced layers; and a lining material having a fiber layer, heat-shielding film layer, and a barrier layer.

18. The molded ceiling according to claim 17, wherein the core material is made of a semi rigid urethane foam for providing shape and rigidity to the molded ceiling.

19. The molded ceiling according to claim 17, wherein the plurality of fiber-reinforced layers is coated or impregnated with the thermosetting adhesive for bonding to the core material.

* * * * *